(12) United States Patent
Hirata et al.

(10) Patent No.: US 10,283,849 B2
(45) Date of Patent: May 7, 2019

(54) ANTENNA DEVICE

(71) Applicant: Sumitomo Electric Industries, Ltd., Osaka-shi, Osaka (JP)

(72) Inventors: Hitoshi Hirata, Osaka (JP); Ichiro Kuwayama, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/748,287

(22) PCT Filed: Jul. 1, 2016

(86) PCT No.: PCT/JP2016/069613
§ 371 (c)(1),
(2) Date: Jan. 29, 2018

(87) PCT Pub. No.: WO2017/033573
PCT Pub. Date: Mar. 2, 2017

(65) Prior Publication Data
US 2018/0219277 A1 Aug. 2, 2018

(30) Foreign Application Priority Data

Aug. 25, 2015 (JP) ................. 2015-166201

(51) Int. Cl.
*H04M 1/00* (2006.01)
*H01Q 1/24* (2006.01)
*H04B 1/036* (2006.01)
*H04B 1/38* (2015.01)
*H01Q 1/02* (2006.01)
*H01Q 1/12* (2006.01)
*H01Q 1/42* (2006.01)
*H01Q 21/06* (2006.01)
*H01Q 21/26* (2006.01)

(52) U.S. Cl.
CPC ............... *H01Q 1/246* (2013.01); *H01Q 1/02* (2013.01); *H01Q 1/1228* (2013.01); *H01Q 1/42* (2013.01); *H01Q 21/065* (2013.01); *H01Q 21/26* (2013.01); *H04B 1/036* (2013.01); *H04B 1/38* (2013.01)

(58) Field of Classification Search
CPC .......... H01Q 1/246; H01Q 1/22; H01Q 23/00; H04B 1/036; H04B 1/38
See application file for complete search history.

(56) References Cited

U.S. PATENT DOCUMENTS 6,556,811 B1 * 4/2003 Sayers .................. H04B 1/036
343/702
9,356,359 B2 * 5/2016 Ma ...................... H04W 84/042
(Continued)

FOREIGN PATENT DOCUMENTS

JP 2003-158465 A 5/2003
JP 2010-256327 A 11/2010
(Continued)

*Primary Examiner* — Tuan Pham
(74) *Attorney, Agent, or Firm* — Drinker Biddle Reath LLP

(57) ABSTRACT

An antenna device includes: an antenna unit; a radio unit processing a radio signal transmitted or received by the antenna unit; and a heat sink unit mounted on the radio unit and externally dissipating heat of the radio unit. The antenna unit is disposed on a side identical to the heat sink unit relative to the radio unit.

4 Claims, 9 Drawing Sheets

(56) References Cited

U.S. PATENT DOCUMENTS

| | | | |
|---|---|---|---|
| 2008/0204350 A1* | 8/2008 | Tam | H01Q 21/0025 343/872 |
| 2009/0231186 A1 | 9/2009 | Barak et al. | |
| 2013/0063317 A1* | 3/2013 | Jonsson | H01Q 1/44 343/721 |
| 2015/0134146 A1* | 5/2015 | Pack | G05D 1/0038 701/2 |
| 2016/0127003 A1* | 5/2016 | Xu | H01Q 1/246 455/562.1 |

FOREIGN PATENT DOCUMENTS

| | | |
|---|---|---|
| JP | 2015-78845 A | 4/2015 |
| WO | WO-01/41257 A1 | 6/2001 |

\* cited by examiner

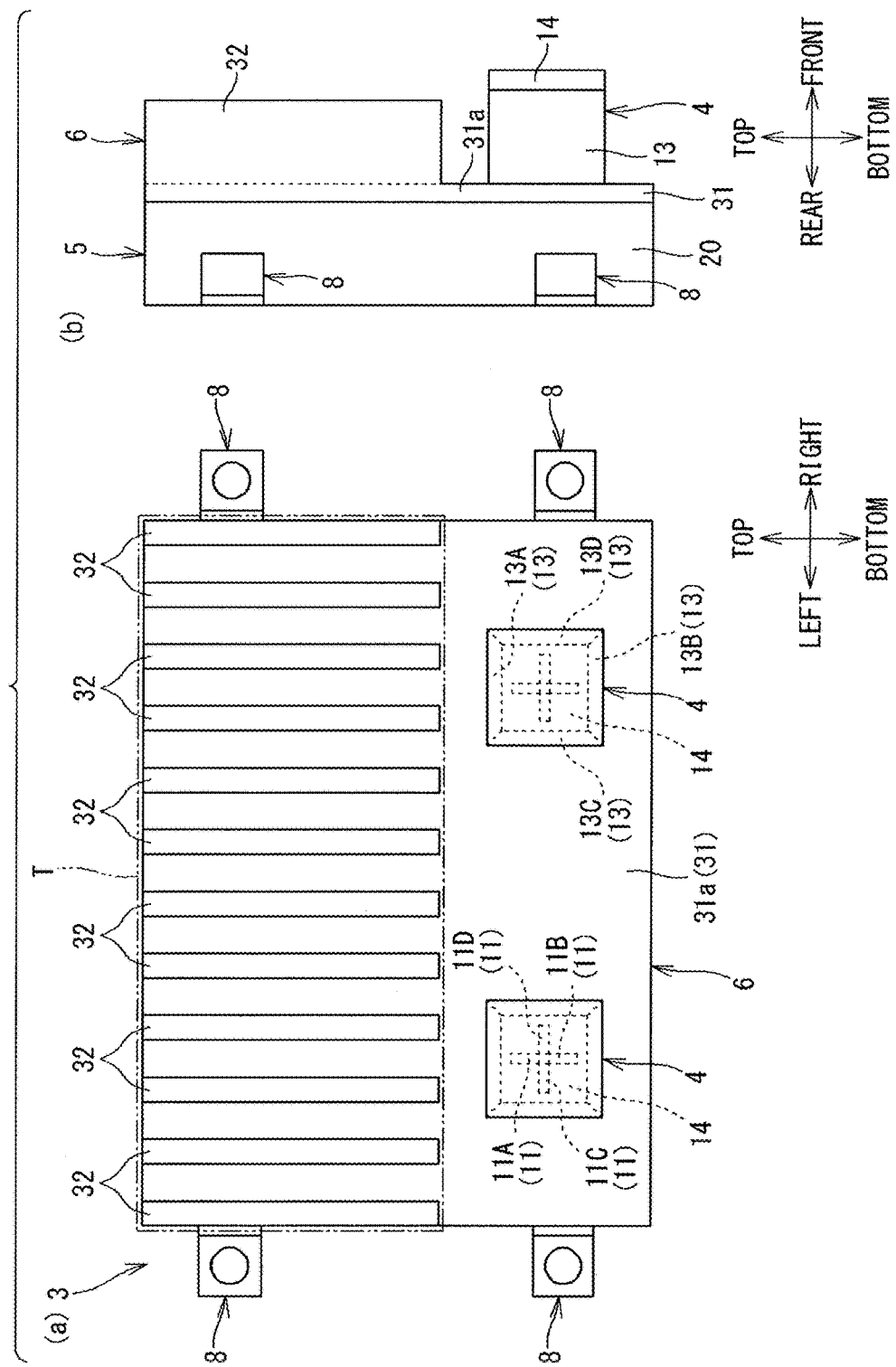

ANTENNA DEVICE

TECHNICAL FIELD

The present invention relates to an antenna device used in, for example, a base station device of a radio communication system.

The present application claims the benefit of priority to Japanese Patent Application No. 2015-166201 filed on Aug. 25, 2015, the disclosure of which is hereby incorporated by reference in its entirety.

BACKGROUND ART

As an antenna device used in a base station device of a radio communication system such as mobile phones, there exists an antenna device in which an antenna element and a radio unit processing a radio signal transmitted or received by the antenna element are integrated with each other (for example, see Patent Literature 1).

In the antenna device disclosed in Patent Literature 1, an antenna unit (a planar antenna and a radome) is mounted on the upper side of a radio unit (a transceiver unit). On the lower side of the radio unit, a heat sink unit (heat dissipation fins) externally dissipating heat of the radio unit is mounted.

CITATION LIST

Patent Literature

Patent Literature 1: Japanese Unexamined Patent Publication No. 2003-158465

SUMMARY OF INVENTION

An antenna device of the present disclosure includes: an antenna unit; a radio unit processing a radio signal transmitted or received by the antenna unit; and a heat sink unit mounted on the radio unit and externally dissipating heat of the radio unit, wherein the antenna unit is disposed on a side identical to the heat sink unit relative to the radio unit.

BRIEF DESCRIPTION OF DRAWINGS

FIG. 9 shows an antenna device according to a second embodiment of the present invention, in which (a) is an elevation as seen from the front side and (b) is a side view.

DESCRIPTION OF EMBODIMENTS

Figure 1:
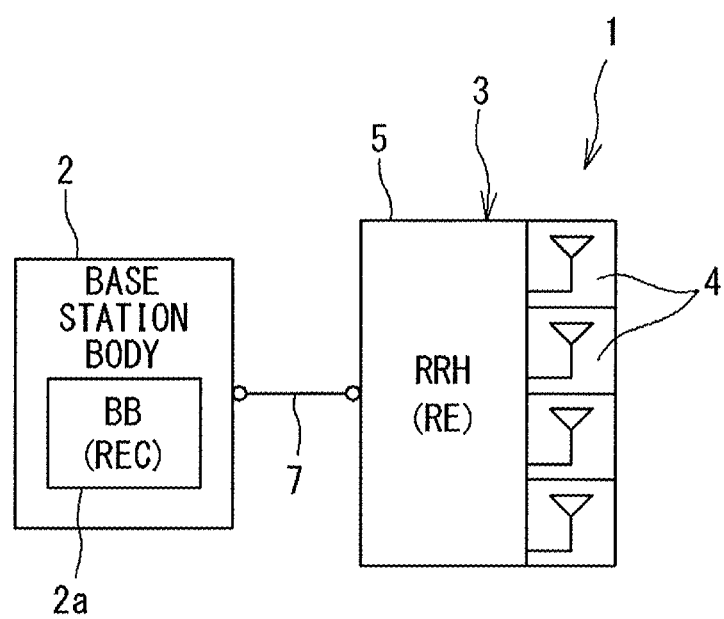
FIG. 1 is a schematic diagram showing a small base station device including an antenna device according to a first embodiment of the present invention.

Problem to be Solved by the Present Disclosure

In a radio communication system used for mobile phones or the like, recent years have seen a sharply increasing communication traffic volume due to proliferation of smartphones and the like. In order to solve the traffic congestion, small cells have been actively introduced. Accordingly, as an antenna device used in a small base station device corresponding to the small cell, an antenna device being small in size and weight is in demand.

However, the antenna device disclosed in Patent Literature 1 has a problem that it necessitates space at each of the upper side and the lower side of the radio unit for disposing the antenna unit and the heat sink unit, respectively, and consequently miniaturization of the whole device cannot be achieved.

In view of the foregoing, an object of the present invention is to provide a novel technique achieving miniaturization of an antenna device including an antenna unit and a heat sink unit.

Effect of the Present Disclosure

The present disclosure can miniaturize an antenna device including an antenna unit and a heat sink unit.

Description of Embodiments of the Present Invention

Firstly, the contents of the embodiments of the invention will be listed and described.

(1) An antenna device according to an embodiment of the present invention includes: an antenna unit; a radio unit processing a radio signal transmitted or received by the antenna unit; and a heat sink unit mounted on the radio unit and externally dissipating heat of the radio unit, wherein the antenna unit is disposed on a side identical to the heat sink unit relative to the radio unit.

In the antenna device, the antenna unit is disposed on the side identical to the heat sink unit relative to the radio unit. Accordingly, the space which is conventionally used for disposing the antenna unit on the side opposite to the heat sink unit relative to the radio unit can be dispensed with. Thus, miniaturization of the antenna device including the antenna unit and the heat sink unit is achieved.

(2) In the antenna device, the heat sink unit preferably includes a plurality of heat dissipation fins, and the antenna unit is preferably disposed inside a disposition region for the plurality of heat dissipation fins as seen from the identical side.

In this case, the antenna unit is disposed inside the disposition region for the plurality of heat dissipation fins. Accordingly, the space for disposing the antenna unit outside the disposition region can be dispensed with.

(3) In the antenna device, the heat sink unit may include a plurality of heat dissipation fins, and the antenna unit may be disposed outside a disposition region for the plurality of heat dissipation fins as seen from the identical side.

In this case, the antenna unit is disposed outside the disposition region for the plurality of heat dissipation fins. Accordingly, the heat dissipation fins become less prone to affect the antenna characteristic of the antenna unit.

(4) In the antenna device, the antenna unit preferably includes an antenna element, and a wall part surrounding the antenna element as seen from the identical side.

In this case, the antenna element is surrounded by the wall part. Accordingly, the heat sink unit becomes less prone to affect the antenna characteristic of the antenna unit.

(5) In the antenna device, the heat sink unit preferably includes a wiring-use hole for inserting a power supply line supplying power to the antenna unit from the radio unit.

In this case, inserting the power supply line into the wiring-use hole of the heat sink unit facilitates the wiring work of the power supply line from the radio unit to the antenna unit.

(6) In the antenna device, the radio unit preferably includes a housing and a plurality of signal processing modules housed in the housing for processing the radio signal, and at least part of the plurality of signal processing modules is disposed denser on the identical side in the housing.

In this case, a cable connecting between the parts of the modules is disposed on the heat dissipator side together with the modules. Accordingly, as compared to the case where the part of the modules is disposed separately on the heat dissipator side and on the opposite side, the cable can be reduced in length. Thus, the cable becomes less prone to be caught by the lid of the housing when the lid is closed.

(7) In the antenna device, the heat sink unit includes a plurality of heat dissipation fins, and the at least part of signal processing modules is disposed at a position corresponding to the plurality of heat dissipation fins in the housing.

In this case, despite the antenna unit being disposed on the side identical to the heat sink unit relative to the radio unit, the heat dissipation fins efficiently externally dissipate heat from the part of the modules.

Details of Embodiments of the Present Invention

In the following, a description will be given of the embodiments of the present invention with reference to the drawings.

[Overall Structure]

FIG. 1 is a schematic diagram showing a small base station device including an antenna device according to a first embodiment of the present invention. In a small base station device 1, an antenna device 3 is connected to a base station device body 2 including a baseband processing unit 2a. The antenna device 3 is installed outdoors or indoors spaced apart from the base station device body 2. The base station device body 2 and the antenna device 3 are connected to each other with, for example, an optical fiber 7. The baseband processing unit 2a that functions as an antenna device control unit performs baseband signal processing in a digital region, and also controls the antenna device 3.

Figure 2:
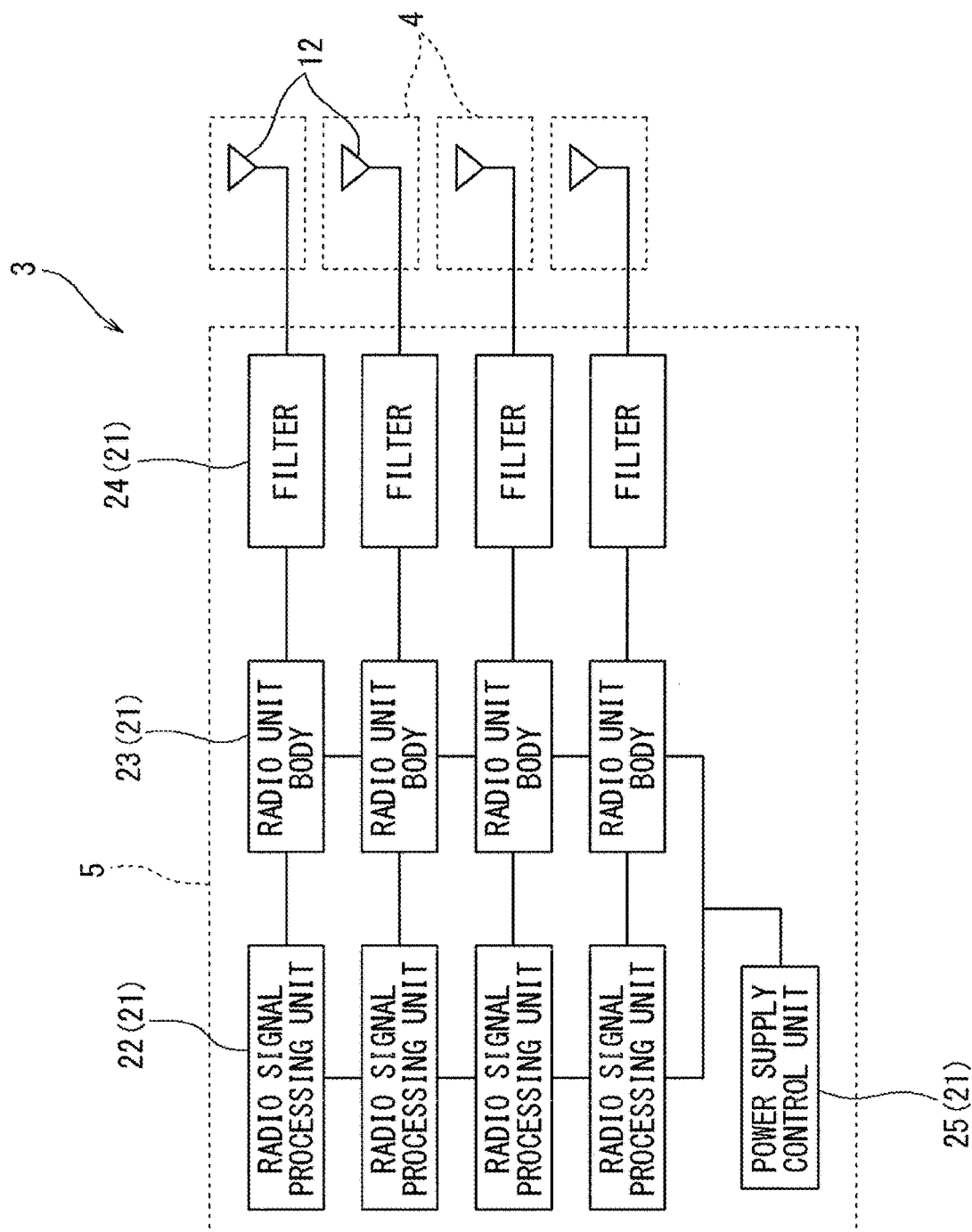
FIG. 2 is a functional block diagram of the antenna device.

FIG. 2 is a functional block diagram of the antenna device 3. The antenna device 3 includes a plurality of (herein, four) antenna units 4 each including an antenna element 12, and a radio unit (remote radio head; RRH) 5 that processes radio signals received or transmitted by the antenna units 4.

The radio unit 5 is structured by a housing 20 (see FIG. 3) housing therein a plurality of signal processing modules 21. In the present embodiment, as the plurality of signal processing modules 21, radio signal processing units 22, radio unit bodies 23, filters 24, and power supply control units (power supply circuits) 25 are housed in the housing 20. The radio signal processing units 22, the radio unit bodies 23, and the filters 24 are provided on a substrate 26 (see FIG. 8) disposed inside the housing 20.

The radio signal processing units 22 process transmission/reception data (digital data) exchanged with the base station device body 2 via the optical fiber 7 or the like. The radio signal processing units 22 each include an AD converter and a demodulator (not shown) for converting an analog reception signal into reception digital data, and a DA converter and a modulator (not shown) for converting transmission digital data into an analog transmission signal.

The radio unit bodies 23 each include an amplifier (not shown) and the like, and connected to the antenna elements 12 via the filters 24, respectively. The radio unit bodies 23 and the radio signal processing units 22 are connected to a power supply control unit 25.

The power supply control unit 25 converts externally supplied power supply voltage into predetermined voltage, and supplies the radio signal processing units 22 and the radio unit bodies 23 with power of the predetermined voltage. The power supply control unit 25 is supplied with power from an external source.

[Antenna Device]

Figure 3:
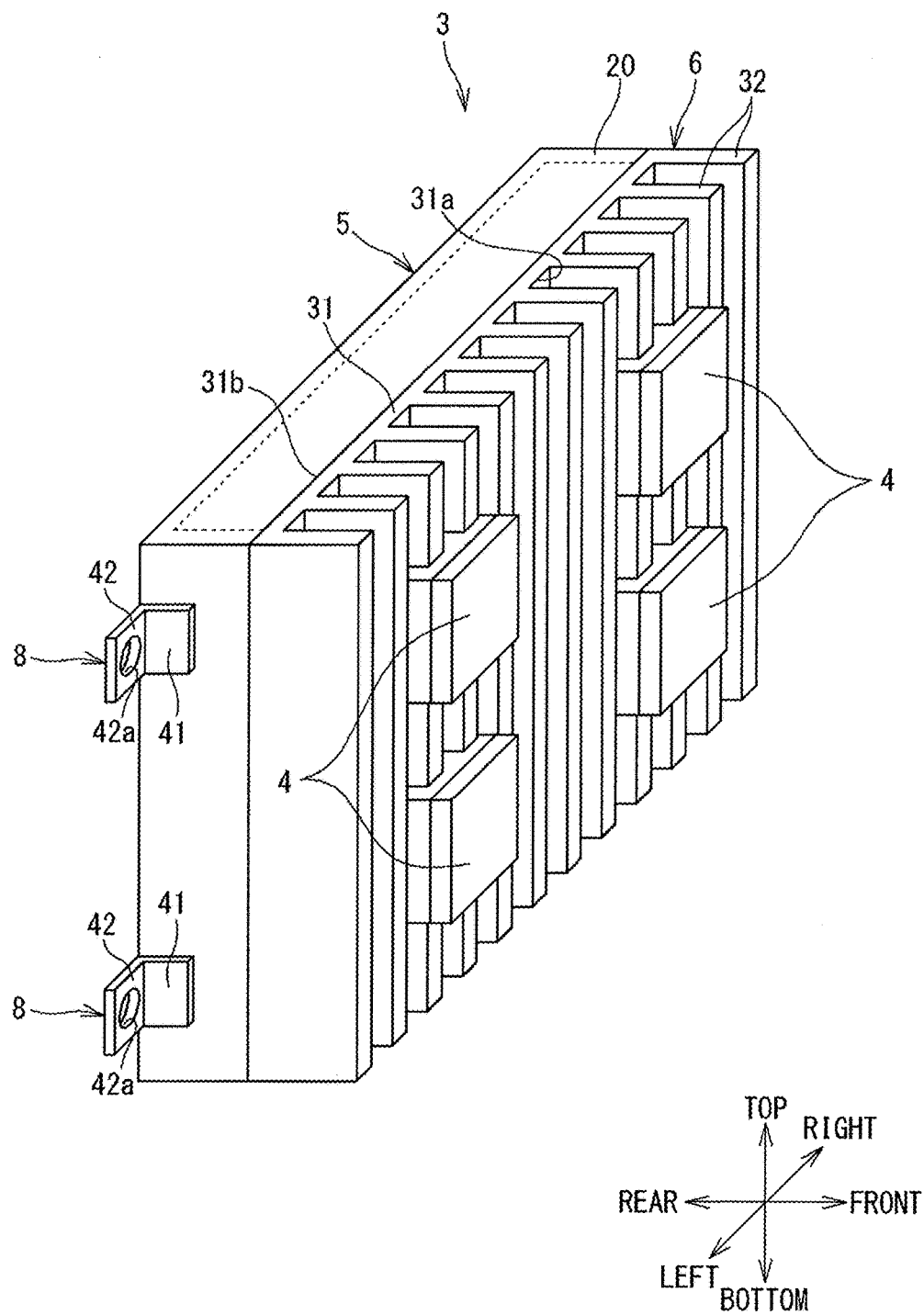
FIG. 3 is a perspective view of the antenna device.

FIG. 3 is a perspective view of the antenna device 3. The antenna device 3 further includes a heat sink unit 6 mounted on the front side of the radio unit 5. The heat sink unit 6 externally dissipates heat of the radio unit 5, and includes a base plate 31 and a plurality of heat dissipation fins 32 which are integrally formed by, for example, aluminum die-cast molding.

To the box-like housing 20, which is open on the front side of the radio unit 5, the base plate 31 is removably attached so as to close the opening. Accordingly, the base plate 31 according to the present embodiment has a function as a lid closing the opening of the housing 20. Note that, the lid closing the opening of the housing 20 may be provided as a member separate from the base plate 31.

The plurality of heat dissipation fins 32 extend over the entire length in the top-bottom direction at a front surface 31a of the base plate 31, and are disposed at predetermined intervals in the right-left direction.

Figure 4:
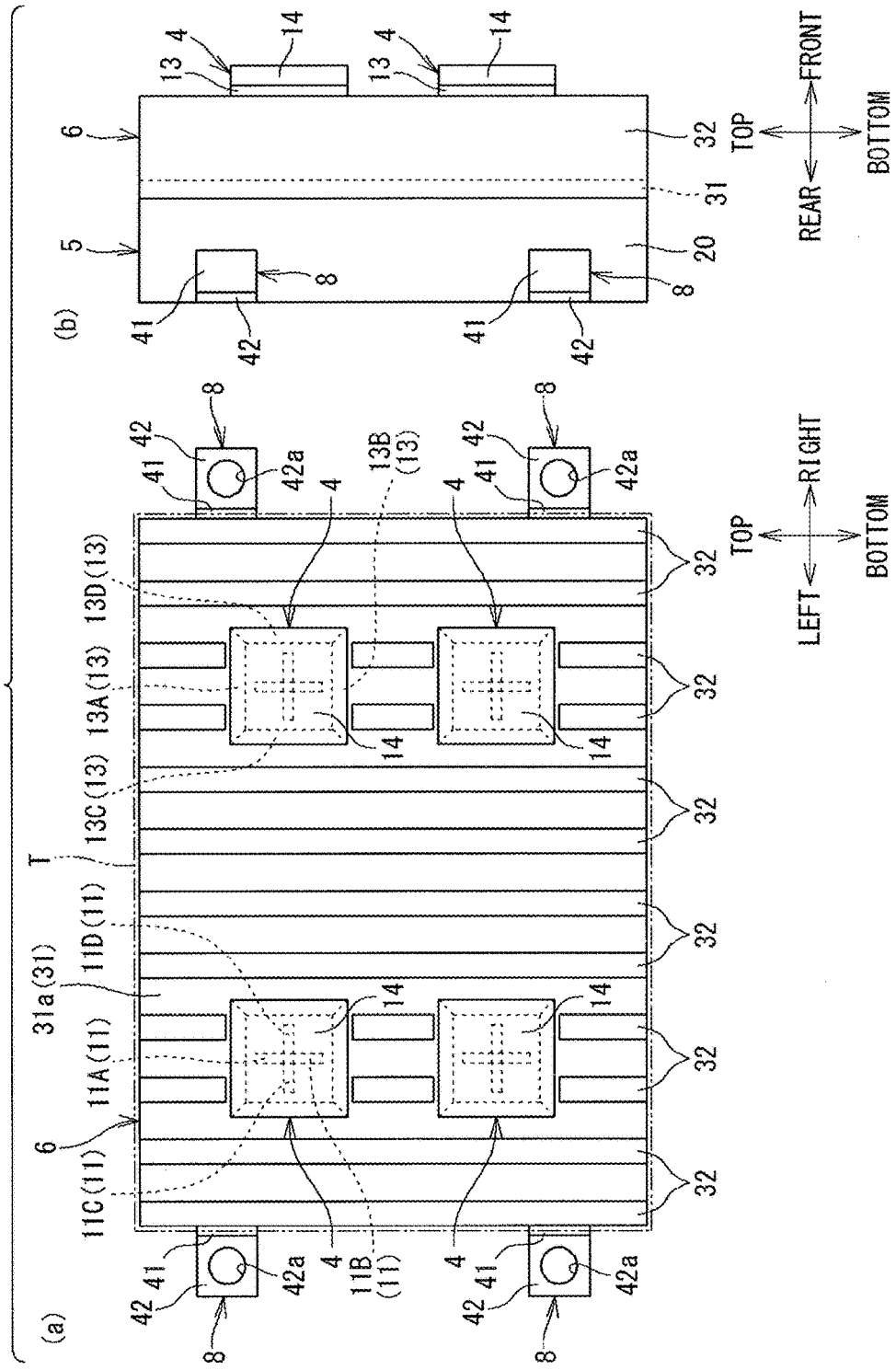
FIG. 4 (a) is an elevation of the antenna device as seen from the front side, and (b) is a side view of the antenna device.

(a) in FIG. 4 is an elevation of the antenna device 3 as seen from the front side, and (b) is a side view of the antenna device 3. In FIG. 3 and FIG. 4 (a), to the outer surface of each of the right and left opposite sidewalls of the housing 20 of the radio unit 5, an upper and lower pair of attachment members 8 are fixed. The attachment members 8 according to the present embodiment fix the housing 20 to the wall surface side of a building such as an office building, and each includes a fixed part 41 fixed to the outer surface of one of the right and left opposite sidewalls of the housing 20, and an attachment part 42 projecting outward in the right-left direction of the fixed part 41. At the attachment part 42, an insertion hole 42a for inserting a screw (not shown) tightened at a screw hole (not shown) formed at the wall surface side of the building is formed to penetrate through in the thickness direction.

Figure 5:
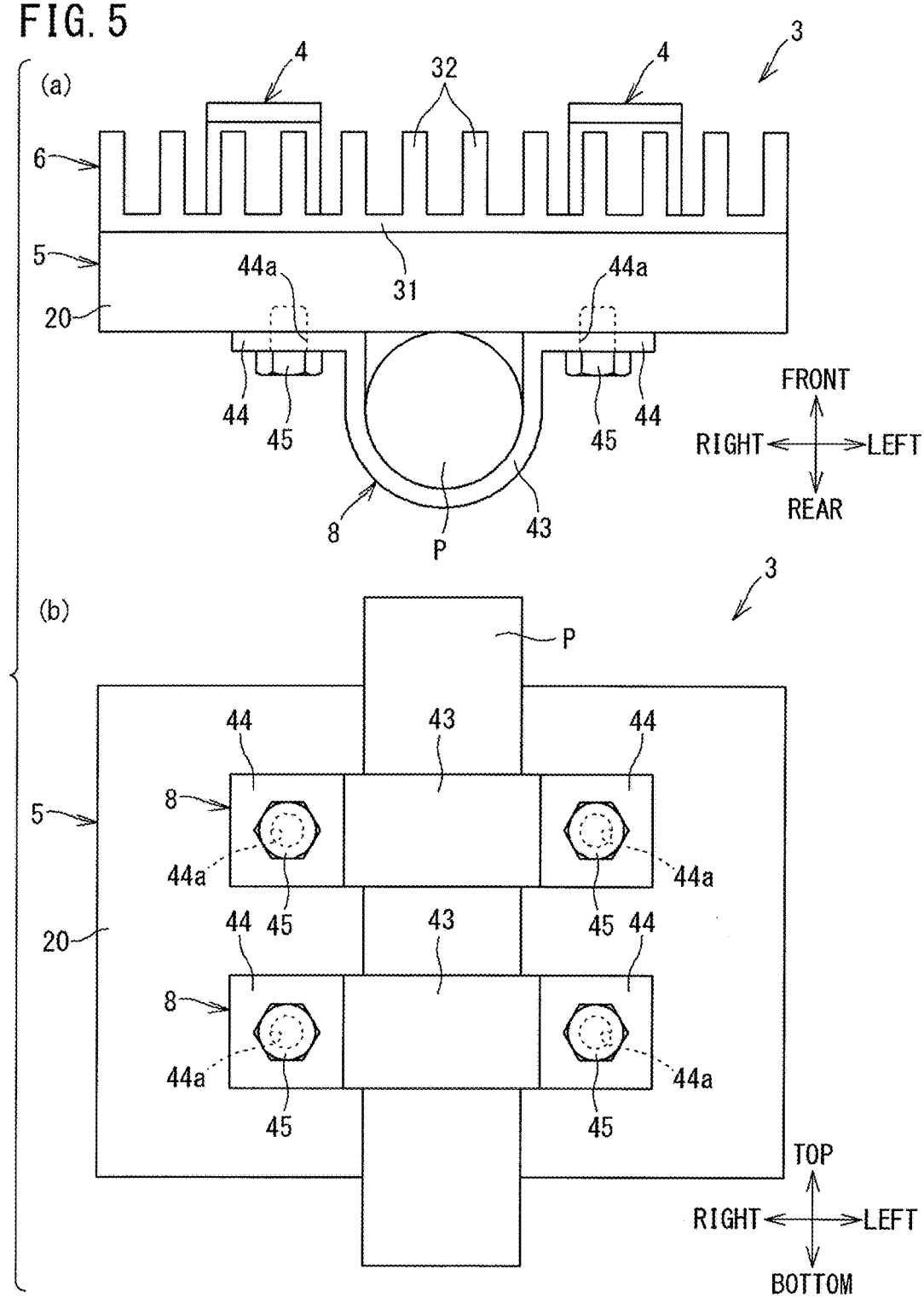
FIG. 5 shows a variation of an attachment member, in which (a) is a plan view and (b) is an elevation as seen from the rear side.

FIG. 5 shows a variation of the attachment member 8, in which (a) is a plan view and (b) is an elevation as seen from the rear side. The attachment member 8 according to the variation fixes the housing 20 of the radio unit 5 to a circular cylindrical post P, and includes a U-shaped band part 43 and a pair of fixed parts 44 extending from the right and left opposite ends of the band part 43 outward in the right-left direction. At the fixed part 44, an insertion hole 44a for inserting a screw 45 tightened at a screw hole (not shown) formed at the rear surface of the housing 20 is formed to penetrate through in the thickness direction.

[Antenna Unit]

In FIG. 3 and FIG. 4 (a), a plurality of antenna units 4 are disposed on the front side relative to the radio unit 5, on which side the heat sink unit 6 is disposed. Further, as seen from the front side of the antenna device 3, the plurality of antenna units 4 are arranged inside a disposition region T for the plurality of heat dissipation fins 32.

Specifically, the plurality of antenna units 4 are disposed at four places in the disposition region T, namely, the upper right part, the lower right part, the upper left part, and the lower left part, respectively, each in the space formed by partially removing the heat dissipation fins 32.

Figure 6:
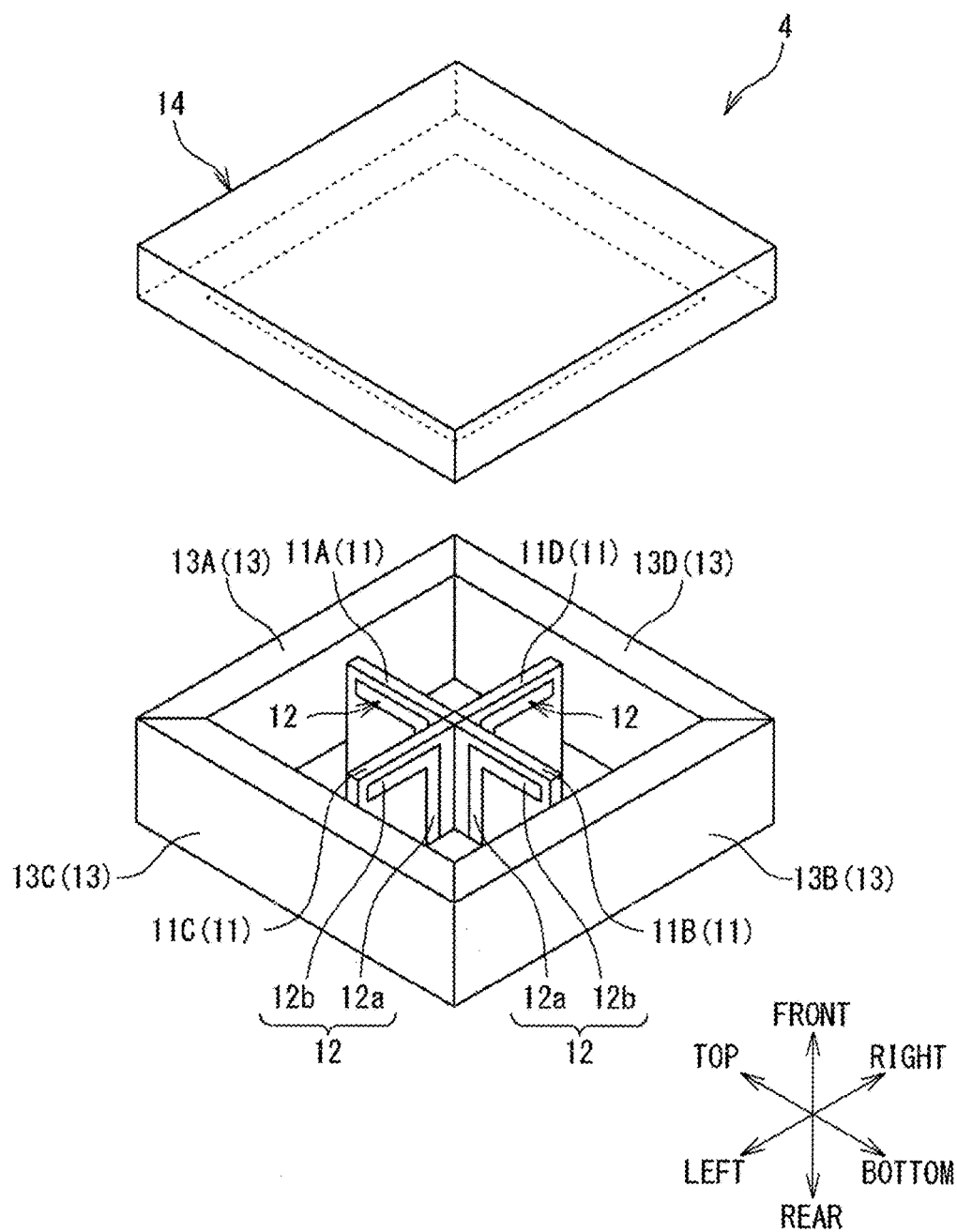
FIG. 6 is an exploded perspective view of an antenna unit.

FIG. 6 is an exploded perspective view of the antenna unit 4. In FIG. 6 and FIG. 4 (a), the antenna unit 4 includes a plurality of (herein, four) substrates 11, an antenna element 12 provided at each of the substrates 11, a plurality of wall parts 13 surrounding the plurality of substrates 11, and a radome 14 covering the plurality of substrates 11 (the antenna elements 12) from the front side.

The plurality of substrates 11 are supported by supporting members 9 (see FIG. 8) so as to stand perpendicularly relative to the front surface 31a of the base plate 31 of the heat sink unit 6. Further, the plurality of substrates 11 are arranged in a cross shape as seen from the front side of the antenna unit 4. That is, the plurality of substrates 11 are made up of a pair of substrates 11A, 11B arranged in the top-bottom direction, and a pair of substrates 11C, 11D arranged in the right-left direction.

On each of the substrates 11, the antenna element 12 made of, for example, metal foil is formed. The antenna elements 12 of the substrates 11A, 11B structure dipole antenna elements for vertical polarization, and each include a first element part 12a extending in the front-rear direction, and a second element part 12b folded outward in the top-bottom direction from the front end of the first element part 12a.

The antenna elements 12 of the substrates 11C, 11D structure dipole antenna elements for horizontal polarization, and each include a first element part 12a extending in the front-rear direction, and a second element part 12b folded outward in the right-left direction from the front end of the first element part 12a.

Figure 7:
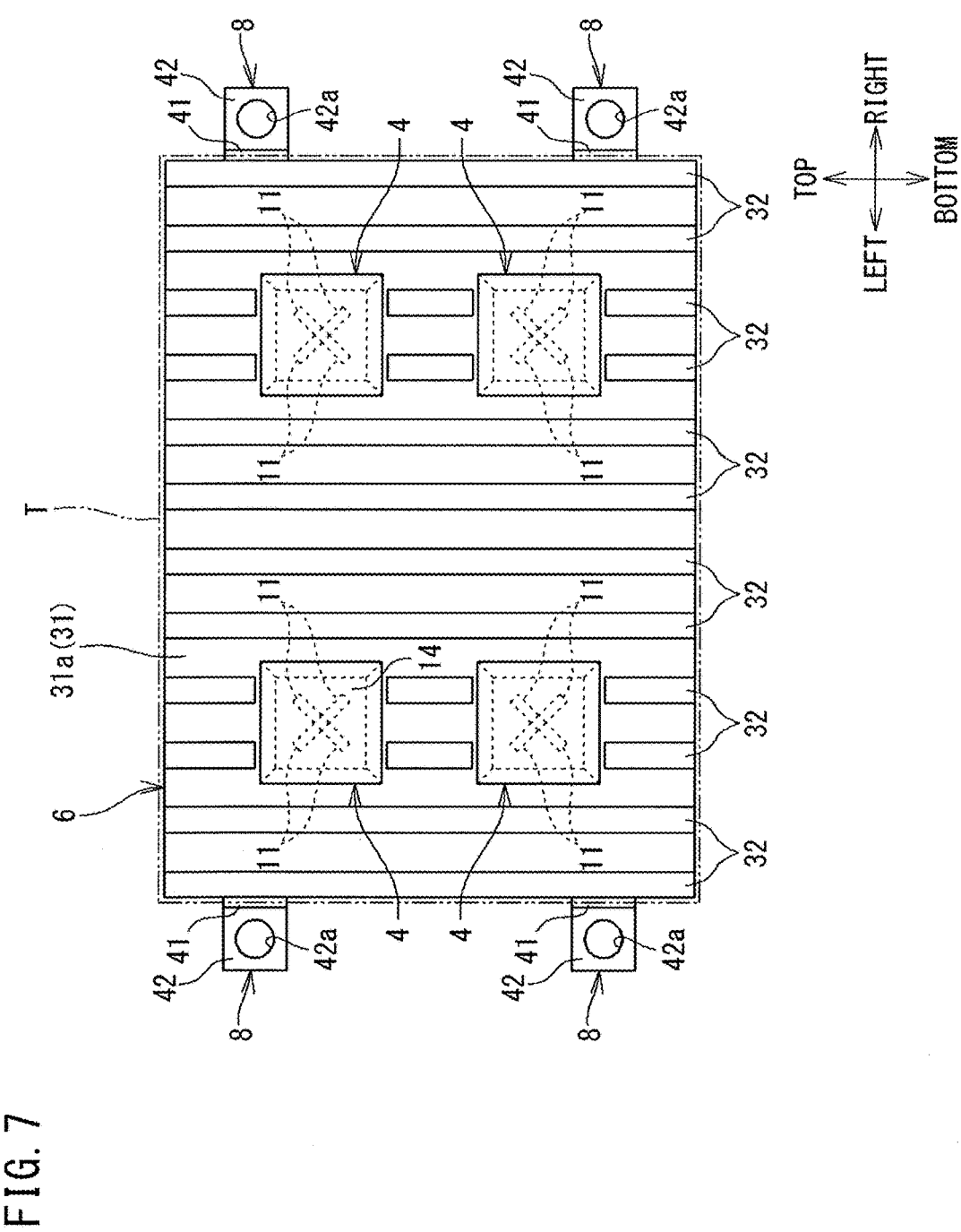
FIG. 7 is an elevation of a variation of the antenna unit as seen from the front side.

Note that, while the plurality of substrates 11 according to the present embodiment are arranged in a cross shape, they may be arranged, for example as shown in FIG. 7, in an X shape. Further, while the antenna elements 12 according to the present embodiment consist of antenna elements for vertical polarization and antenna elements for horizontal polarization, they may be antenna elements for one of vertical polarization and horizontal polarization. Still further, the number of the antenna elements 12 is not limited to four, and may be, for example, one, two, or eight. Still further, the antenna elements 12 may be antenna elements of the type other than the dipole antenna elements.

In FIG. 6 and FIG. 4 (a), the plurality of wall parts 13 are formed by flat plate members made of metal such as aluminum, and are fixed so as to stand perpendicularly relative to the front surface 31a of the base plate 31 of the heat sink unit 6. The front end of the wall parts 13 desirably project frontward than the heat dissipation fins 32 (see FIG. 4 (b)). Further, the plurality of wall parts 13 are arranged in a quadrangular shape so as to surround the plurality of substrates 11 as seen from the front side of the antenna unit 4.

That is, the plurality of wall parts 13 consist of a pair of wall parts 13A, 13B extending in the right-left direction as seen from the front side of the antenna unit 4 and arranged at a predetermined interval in the top-bottom direction, and a pair of wall parts 13C, 13D extending in the top-bottom direction and arranged at a predetermined interval in the right-left direction. Note that, at least part of the plurality of wall parts 13A to 13D may be integrated with the heat sink unit 6.

The radome 14 is formed as a box-like lid (see FIG. 8), and removably attached to the wall parts 13 having its opening-side end (rear end surface) abutted on the front end surface of the wall parts 13. Thus, the plurality of substrates 11 and the antenna elements 12 are waterproofed by the plurality of wall parts 13 and the radome 14.

Figure 8:
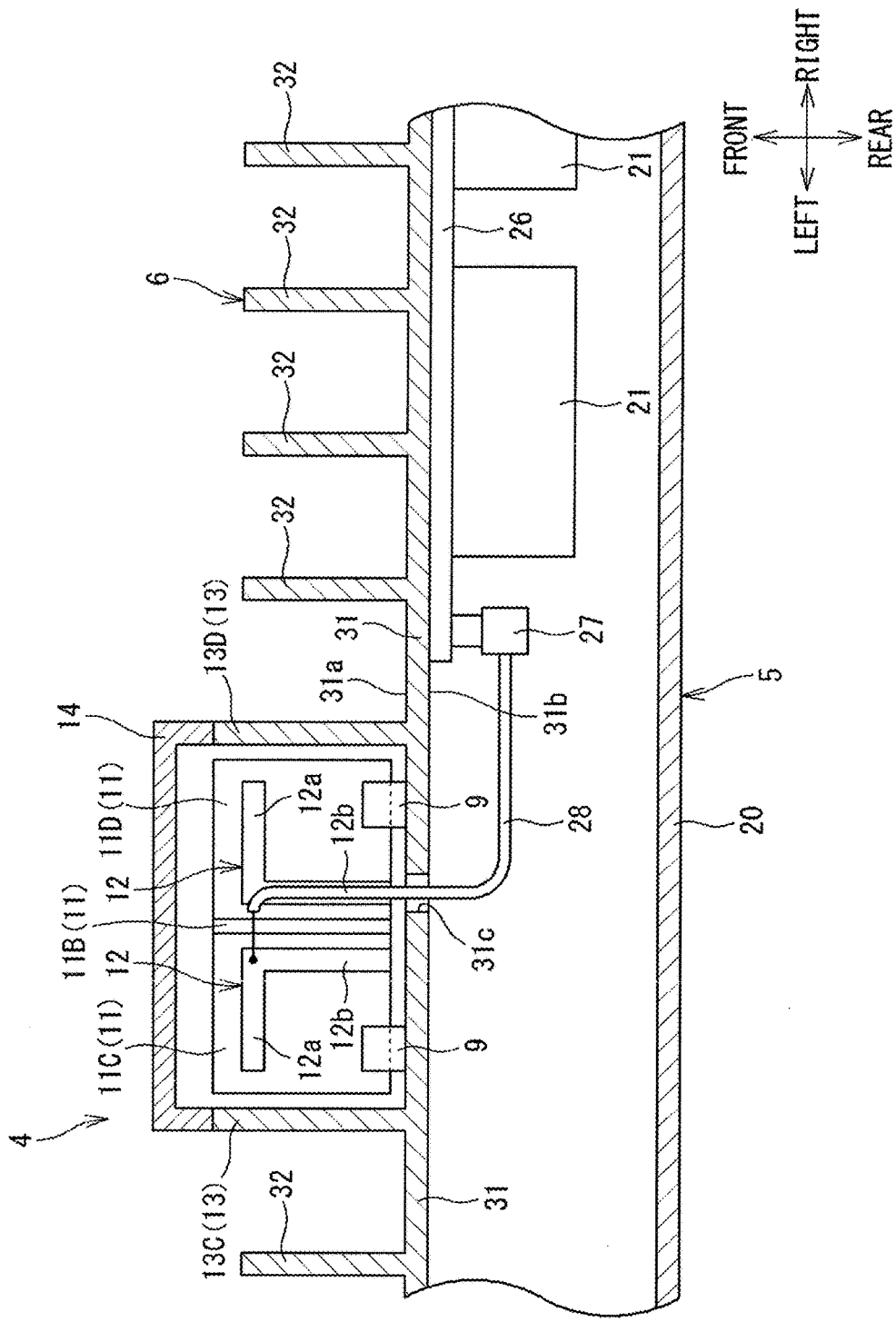
FIG. 8 is a section view of the antenna device.

FIG. 8 is a section view of the antenna device 3. The plurality of signal processing modules 21 of the radio unit 5 are disposed denser on the front side in the housing 20, that is, on the heat sink unit 6 side. Specifically, the plurality of signal processing modules 21 are provided on the substrate 26 fixed to a rear surface 31b of the base plate 31 of the heat sink unit 6. The substrate 26 is fixed to the rear surface 31b at a position not corresponding to the antenna units 4, that is, at a position corresponding to the plurality of heat dissipation fins 32. Accordingly, the plurality of signal processing modules 21 are disposed at a position corresponding to the plurality of heat dissipation fins 32. Note that, in the present embodiment, while all the plurality of signal processing modules 21 are disposed denser on the heat sink unit 6 side, at least part of the signal processing modules 21 (for example, the signal processing module 21 with great heat emission) should be disposed on the heat sink unit 6 side.

On the substrate 26, a power supply connector 27 is provided. To the power supply connector 27, one end of a power supply line 28 supplying power to the antenna elements 12 of the antenna unit 4 is connected. To the base plate 31 of the heat sink unit 6, a wiring-use hole 31c for inserting the power supply line 28 is formed at a position corresponding to the antenna unit 4 so as to penetrate through in the thickness direction of the base plate 31. Thus, other end of the power supply line 28 is inserted into the wiring-use hole 31c and connected to the antenna elements 12. The periphery of the wiring-use hole 31c is waterproofed so as to prevent entry of water inside the housing 20.

[Effect]

As has been described above, in the antenna device 3 according to the present embodiment, the antenna units 4 are disposed on the side identical to the heat sink unit 6 relative to the radio unit 5. Accordingly, the space which is conventionally used for disposing the antenna units 4 on the side opposite to the heat sink unit 6 relative to the radio unit 5 can be dispensed with. Thus, miniaturization of the antenna device 3 including the antenna units 4 and the heat sink unit 6 is achieved.

Further, the antenna units 4 are disposed inside the disposition region T for the plurality of heat dissipation fins 32 as seen from the front side of the antenna device 3. Accordingly, the space for disposing the antenna units 4 outside the disposition region T can be dispensed with.

Still further, the antenna elements 12 of each of the antenna units 4 are surrounded by the wall parts 13. Accordingly, the heat sink unit 6 becomes less prone to affect the antenna characteristic of the antenna units 4.

Still further, the heat sink unit 6 includes the wiring-use hole 31c for inserting the power supply line 28 supplying power to the antenna unit 4 from the radio unit 5. Accordingly, inserting the power supply line 28 into the wiring-use hole 31c facilitates the wiring work of the power supply line 28 from the radio unit 5 to the antenna unit 4.

Still further, the plurality of signal processing modules 21 of the radio unit 5 are disposed denser on the heat sink unit 6 side in the housing 20. Accordingly, the cable (not shown) connecting between the signal processing modules 21 is also disposed on the heat sink unit 6 side together with the plurality of signal processing modules 21. Accordingly, as compared to the case where a plurality of signal processing modules 21 are disposed separately on the heat sink unit 6 and on the opposite side, the cable between the signal processing modules 21 can be reduced in length.

Still further, as in the present embodiment, in the case where the power supply line 28 is inserted into the wiring-use hole 31c of the heat sink unit 6, the power supply line 28 can also be reduced in length. This configuration prevents attenuation of the radio signal due to the power supply line 28 and prevents the power supply line or the cable from being caught by the lid (in the present embodiment, the heat sink unit 6) of the housing 20 when the lid is closed.

Still further, the plurality of signal processing modules 21 are disposed at a position corresponding to the plurality of heat dissipation fins 32 in the housing 20. Accordingly, despite the antenna units 4 being disposed on the side identical to the heat sink unit 6 relative to the radio unit 5, the heat dissipation fins 32 efficiently externally dissipate the heat from the plurality of signal processing modules 21.

Second Embodiment

FIG. 9 shows an antenna device 3 according to a second embodiment of the present invention, in which (a) is an elevation as seen from the front side, and (b) is a side view. The antenna device 3 according to the present embodiment is different from the first embodiment in the position where the heat dissipation fins 32 of the heat sink unit 6 are formed and the position where the antenna units 4 are disposed.

The plurality of heat dissipation fins 32 according to the present embodiment extend, on the front surface 31a of the base plate 31, from the upper end to the position slightly below the center of the base plate 31. The antenna units 4 according to the present embodiment are disposed by two in number at a predetermined interval in the right-left direction, outside the disposition region T for the plurality of heat dissipation fins 32, that is, on the lower side in the front surface 31a of the base plate 31 as seen from the front side of the antenna device 3. Note that, those constituents not described in the second embodiment are similar to those in the first embodiment.

As has been described above, in the antenna device 3 according to the second embodiment, the antenna units 4 are disposed outside the disposition region T for the plurality of heat dissipation fins 32 as seen from the front side of the antenna device 3. Accordingly, the heat dissipation fins 32 become less prone to affect the antenna characteristic of the antenna units 4.

[Others]

Note that, the embodiments disclosed herein should be construed as illustrative in all their aspects and not limiting. It is intended that the scope of the present invention is shown not by the meanings of the description but by the scope of the claims, and includes meanings equivalent to the scope of the claims and all modifications within the scope.

REFERENCE SIGNS LIST

1: SMALL BASE STATION DEVICE
2: BASE STATION DEVICE BODY
2A: BASEBAND PROCESSING UNIT
3: ANTENNA DEVICE
4: ANTENNA UNIT
5: RADIO UNIT (RRH)
6: HEAT SINK UNIT
7: OPTICAL FIBER
8: ATTACHMENT MEMBER
9: SUPPORTING MEMBER
11, 11A to 11D: SUBSTRATE
12: ANTENNA ELEMENT
12a: FIRST ELEMENT PART
12B: SECOND ELEMENT PART
13, 13A to 13D: WALL PART
14: RADOME
20: HOUSING
21: SIGNAL PROCESSING MODULE
22: RADIO SIGNAL PROCESSING UNIT
23: RADIO UNIT BODY
24: FILTER
25: POWER SUPPLY CONTROL UNIT
26: SUBSTRATE
27: POWER SUPPLY CONNECTOR
28: POWER SUPPLY LINE
31: BASE PLATE
31A: FRONT SURFACE
31B: REAR SURFACE
31C: WIRING-USE HOLE
32: HEAT DISSIPATION FIN
41: FIXED PART
42: ATTACHMENT PART
42A: INSERTION HOLE
43: BAND PART
44: FIXED PART
44A: INSERTION HOLE
45: SCREW
P: POST
T: DISPOSITION REGION

The invention claimed is:

1. An antenna device comprising:
an antenna unit;
a radio unit processing a radio signal transmitted or received by the antenna unit; and
a heat sink unit mounted on the radio unit and externally dissipating heat of the radio unit, wherein
the antenna unit is disposed on a side identical to the heat sink unit relative to the radio unit,
the heat sink unit includes a base plate and a plurality of heat dissipation fins provided on the base plate,
the antenna unit is disposed inside a disposition region for the plurality of heat dissipation fins as seen from the identical side,
the antenna unit includes an antenna element, and a wall part surrounding the antenna element as seen from the identical side, and
the wall part is integrally formed with the base plate.

2. The antenna device according to claim 1, wherein the heat sink unit includes a wiring-use hole for inserting a power supply line supplying power to the antenna unit from the radio unit.

3. The antenna device according to claim 1, wherein the radio unit includes a housing and a plurality of signal processing modules housed in the housing for processing the radio signal, and
at least part of the plurality of signal processing modules is disposed denser on the identical side in the housing.

4. The antenna device according to claim 3, wherein the at least part of the signal processing modules is disposed at a position corresponding to the plurality of heat dissipation fins inside the housing.

* * * * *